United States Patent
Kim et al.

(10) Patent No.: US 11,923,745 B2
(45) Date of Patent: Mar. 5, 2024

(54) MOTOR ACCOMMODATION STRUCTURAL BODY, AUTOMOBILE INCLUDING MOTOR ACCOMMODATION STRUCTURAL BODY, AND METHOD FOR MANUFACTURING MOTOR ACCOMMODATION STRUCTURAL BODY

(71) Applicant: HYUNDAI MOBIS CO., LTD., Seoul (KR)

(72) Inventors: Yong Ho Kim, Yongin-si (KR); Seung Hun Kim, Yongin-si (KR); Yeong Woo Seo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 135 days.

(21) Appl. No.: 17/374,783

(22) Filed: Jul. 13, 2021

(65) Prior Publication Data

US 2022/0021265 A1    Jan. 20, 2022

(30) Foreign Application Priority Data

Jul. 14, 2020 (KR) .................. 10-2020-0087025

(51) Int. Cl.
*H02K 5/04* (2006.01)
*H02K 15/14* (2006.01)

(52) U.S. Cl.
CPC .............. *H02K 5/04* (2013.01); *H02K 15/14* (2013.01)

(58) Field of Classification Search
CPC ............. H02K 5/04; H02K 15/14; H02K 9/12
USPC ........... 310/89, 91, 402, 413, 418, 422, 431
See application file for complete search history.

(56) References Cited

U.S. PATENT DOCUMENTS

| 10,256,700 B1 * | 4/2019 | Hopkins | ................ H02K 1/148 |
| 2018/0159400 A1 * | 6/2018 | Michna | .................... B60K 1/00 |

FOREIGN PATENT DOCUMENTS

| CN | 1537352 A | 10/2004 | |
| CN | 108134474 A | 6/2018 | |
| CN | 207939320 U | 10/2018 | |
| DE | 202014010659 U1 * | 4/2016 | ............... H02K 5/26 |
| DE | 10 2015 212 442 A1 | 1/2017 | |
| FR | 2828349 A1 * | 2/2003 | ............... H02K 5/26 |
| JP | 09247885 A * | 9/1997 | |
| WO | WO-2021069132 A1 * | 4/2021 | ............... H02K 5/20 |

OTHER PUBLICATIONS

Office Action dated Sep. 28, 2023 for corresponding Chinese Patent Application No. 202110797622.1 (See English Translation).

* cited by examiner

*Primary Examiner* — Jose A Gonzalez Quinones
(74) *Attorney, Agent, or Firm* — MORGAN, LEWIS & BOCKIUS LLP

(57) ABSTRACT

Disclosed are a motor accommodation structural body, an automobile including the motor accommodation structural body, and a method for manufacturing the motor accommodation structural body. According to one aspect of the present disclosure, disclosed is a motor accommodation structural body for accommodating a motor for an automobile, the motor accommodation structural body including: a housing having an empty space formed therein; a guide unit which is provided on an outer surface of the housing, has a shape protruding outward, and extends along a longitudinal direction L of the housing; and a fixing bracket unit having a coupling portion which has one side coupled to the guide unit and the other side coupled to the automobile.

20 Claims, 12 Drawing Sheets

MOTOR ACCOMMODATION STRUCTURAL BODY, AUTOMOBILE INCLUDING MOTOR ACCOMMODATION STRUCTURAL BODY, AND METHOD FOR MANUFACTURING MOTOR ACCOMMODATION STRUCTURAL BODY

CROSS-REFERENCE TO RELATED APPLICATION(S)

This application claims priority from and the benefit of Korean Patent Application No. 10-2020-0087025, filed on Jul. 14, 2020, which is hereby incorporated by reference for all purposes as if set forth herein.

TECHNICAL FIELD

Exemplary embodiments relate to a motor accommodation structural body, an automobile including the motor accommodation structural body, and a method for manufacturing the motor accommodation structural body and, more particularly, to: a structural body having a structure capable of accommodating a motor and including a housing and a cover; an automobile including the structural body; and a method for manufacturing the structural body.

BACKGROUND

In order to mount motors constituted by rotors and stators into automobiles, the motors need to be accommodated in structural bodies made of housings and covers. Brackets are additionally provided in the structural bodies, especially, in the covers. According to the related art, as the brackets were coupled to other components of vehicles (e.g., engines, transmissions, and chassis), the motors could be mounted into the automobiles in a fixed state.

Meanwhile, when the type of an automobile is changed, the capacity, size, and the like of a motor to be mounted to the automobile is changed, and accordingly, the structure of a structural body for accommodating the motor needs to be changed.

However, according to the related art, in order to mount different types of motors into different types of automobiles, manufacturing equipment for manufacturing a structural body for accommodating the motor was also necessarily changed. Thus, it was disadvantageous in terms of costs required to manufacture the structural body and times and spaces required to equip with manufacturing equipment.

In particular, according to the related art, a housing was manufactured through a die casting process using a die. In order to manufacture a different type of structural body due to a structural change of the motor, a different type of die had to be additionally equipped. There were manufacturing limitations in terms of not only the costs and times required to manufacture the die but also separate costs and times additionally required to evaluate the performance of the die newly manufactured.

SUMMARY

Exemplary embodiments of the present disclosure provide a structural body. In order to manufacture a structural body having a different structure due to a structural change of a motor, components of the structural body are divided into parts which can be used in common irrespective of the types of structural bodies and parts which are changed according to the types of structural bodies. Thus, even if a structural body having a structure different from an existing one is manufactured, the structural change thereof is minimized.

A first exemplary embodiment of the present disclosure provides a motor accommodation structural body for accommodating a motor for an automobile, the motor accommodation structural body including: a housing having an empty space formed therein; a guide unit which is disposed on an outer surface of the housing, has a shape protruding outward, and extends along a longitudinal direction L of the housing; and a fixing bracket unit having a coupling portion which has one side coupled to the guide unit and another side coupled to the automobile.

The guide unit may be integrally formed with the housing.

The guide unit may be separatable from the housing, and the guide unit may be coupled to an outer surface of the housing.

The motor accommodation structural body may further include: a first cover coupled to one side surface of the housing in the longitudinal direction L; and a second cover coupled to another side surface of the housing in the longitudinal direction L.

The housing may have a through-flow path formed therein, extends along the longitudinal direction L of the housing, and passes through the housing.

A first connection flow path communicating with the through-flow path may be formed in the first cover, and a second connection flow path communicating with the through-flow path may be formed in the second cover.

The through-flow path may be provided in plural. One end portion of the first connection flow path may communicate with one of the plurality of through-flow paths, and another end portion of the first connection flow path may communicate with another one of the plurality of through-flow paths.

The guide unit may be provided in plural along a circumferential direction of the housing.

A groove having a shape recessed inward from the housing may be formed in an outer surface of the housing, and the guide unit may be inserted into the groove.

The housing may include: a housing body portion that forms a body of the housing; and a plurality of protrusion portions which are disposed on an outer surface of the housing body portion and have a shape protruding outward from the housing body portion. The groove may be formed between two neighboring protrusion portions among the plurality of protrusion portions.

In areas except for the area where the groove is formed, distances from a central axis of the housing in a circumferential direction to the outer surface of the housing may be constant.

The guide unit may be interfered by the first cover or the second cover in the longitudinal direction L of the housing.

An interference portion having a shape protruding outward may be formed in an outer surface of the first cover or the second cover, and the guide unit may be interfered by the interference portion in the longitudinal direction L of the housing.

The groove may be provided in plural along a circumferential direction of the housing, and the guide unit may be inserted into each of some of the plurality of grooves.

One end portion of the guide unit inserted into the groove of the housing may be located at the same height as an outer circumferential surface of the housing in areas except for the plurality of protrusion portions, or may be located outward from the outer circumferential surface.

One end portion of the guide unit inserted into the groove may be located inward from an outer circumferential surface of the housing.

A second exemplary embodiment of the present disclosure provides an automobile including: a motor for an automobile, which includes a stator; and a motor accommodation structural body configured to accommodate the motor. The motor accommodation structural body may include: a housing having an empty space formed therein and accommodating the stator in the empty space; a first cover coupled to one side surface of the housing in a longitudinal direction L; second cover coupled to another side surface of the housing in the longitudinal direction L; a guide unit which is disposed on an outer surface of the housing, has a shape protruding outward, and extends along the longitudinal direction L of the housing; and a fixing bracket unit having a coupling portion which has one side coupled to the guide unit and another side coupled to the automobile.

A third exemplary embodiment of the present disclosure provides a method for manufacturing a motor accommodation structural body, the method including: a first operation of manufacturing a structural material, which is formed in a cylindrical shape and has a first through-hole at a center of the structural material, through a drawing or extrusion process; a second operation of manufacturing a housing having a predetermined length by cutting the structural material in a direction perpendicular to a longitudinal direction of the structural material; and a third operation of coupling a first cover to one side surface of the housing in a longitudinal direction L and coupling a second cover to another side surface of the housing in the longitudinal direction L.

In the first operation, a plurality of second through-holes, which are provided along a circumferential direction and pass through the structural material, may be formed in the structural material. In the second operation, a plurality of through-flow paths, which are provided along the circumferential direction, pass through the housing, and have a shape corresponding to the second through-holes, may be formed in the housing. In the third operation, a first connection flow path and a second connection flow path may be formed in the first cover and the second cover, respectively, and the first cover and the second cover may be coupled to the housing so that each of the first connection flow path and the second connection flow path communicates with each of the plurality of through-flow paths.

A guide unit having a shape protruding outward may be provided on an outer surface of the housing. In the first operation and the second operation, the guide unit may be integrally formed with the housing.

A groove having a shape recessed inward from the housing may be formed in an outer surface of the housing. The method further may include a fourth operation of inserting a guide unit, which extends along the longitudinal direction L of the housing, into the groove formed in the outer surface of the housing.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a motor accommodation structural body, an automobile including the motor accommodation structural body, and a method for manufacturing the motor accommodation structural body according to the present disclosure will be described with reference to the drawings.

Motor Accommodation Structural Body

Figure 1:
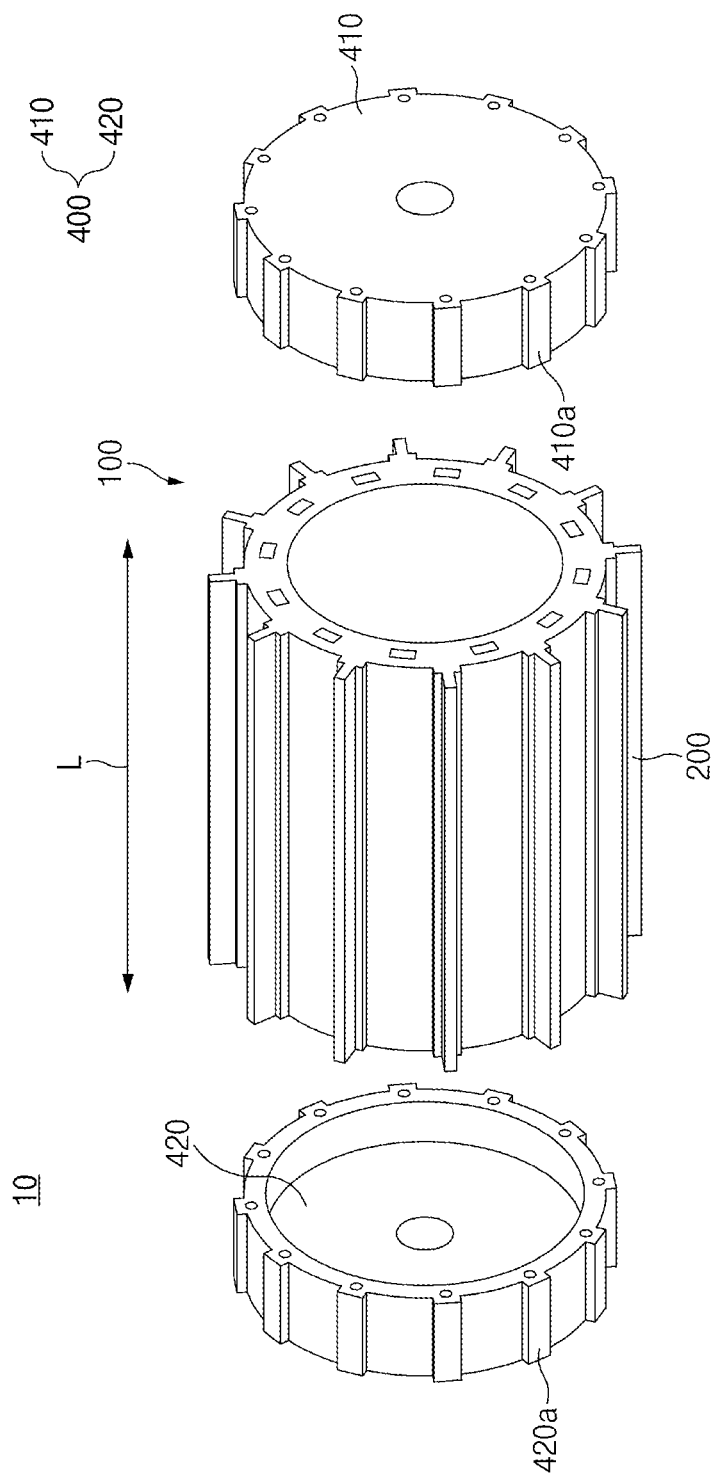
FIG. 1 is an exploded perspective view illustrating a state in which coupled structures between a housing and a cover are disassembled in a motor accommodation structural body according to the present disclosure.
Figure 2:
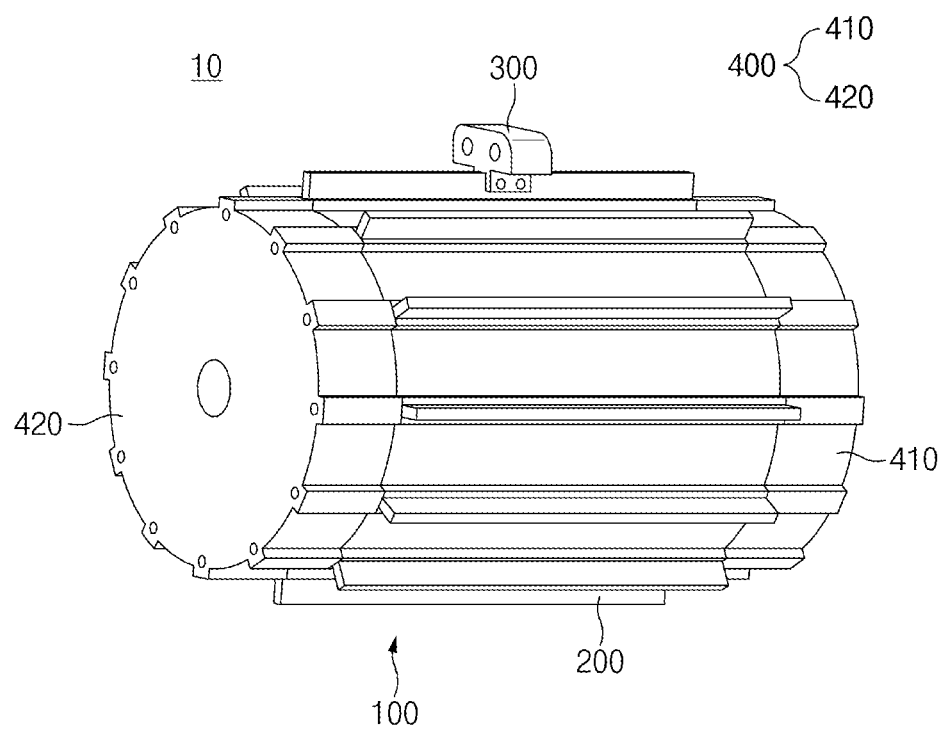
FIG. 2 is a perspective view illustrating a state in which components of the motor accommodation structural body are coupled.

FIG. 1 is an exploded perspective view illustrating a state in which coupled structures between a housing and a cover are disassembled in a motor accommodation structural body according to the present disclosure, and FIG. 2 is a perspective view illustrating a state in which components of the motor accommodation structural body of FIG. 1 are coupled.

An accommodation structural body 10 (hereinafter, referred to as a 'structural body') according to the present disclosure may be a component for accommodating a motor. More specifically, the structural body 10 may be a component for accommodating the motor while preventing the motor from moving relative to other components. For example, the structural body 10 according to the present disclosure may be a component for accommodating the motor while preventing the motor from moving relatively inside an automobile.

Referring to FIGS. 1 and 2, the structural body 10 may include a housing 100 having an empty space formed therein. The empty space formed in the housing 100 may provide a space in which a motor is accommodated. More preferably, the empty space formed in the housing 100 may provide a space in which a stator is accommodated (see FIG. 12). Meanwhile, in the specification, a longitudinal direction L of the housing 100 is defined as a direction extending from one side surface of the housing (a right side surface with respect to FIG. 1) toward the other side surface of the housing (a left side surface with respect to FIG. 1) or defined as a direction opposite thereto.

Continuing to refer to FIGS. 1 and 2, the structural body 10 according to the present disclosure may include a cover 400 coupled to the housing 100. More specifically, the structural body 10 according to the present disclosure may include: a first cover 410 coupled to the one side surface of the housing 100 in the longitudinal direction L; and a second cover 420 coupled to the other side surface of the housing 100 in the longitudinal direction L. As illustrated in FIG. 1, an empty space may also be defined in the inside of each of the first cover 410 and the second cover 420. Here, the first cover 410 and the second cover 420 may be components for accommodating portions of the stator of the motor which are not accommodated in the empty space formed in the housing 100 (see FIG. 12).

Figure 3:
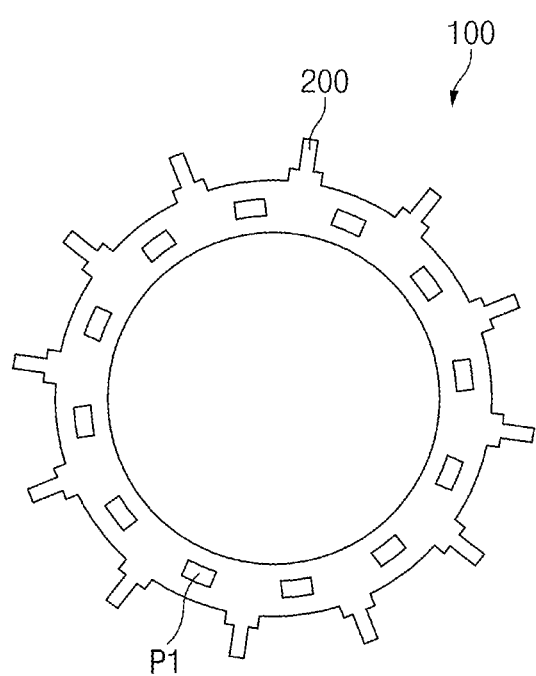
FIG. 3 is a vertical cross-sectional view in a circumferential direction illustrating a cross-sectional structure of a housing and a guide unit according to a first exemplary embodiment of the present disclosure.

FIG. 3 is a vertical cross-sectional view in a circumferential direction illustrating a cross-sectional structure of a housing and a guide unit according to a first exemplary embodiment of the present disclosure.

As illustrated in FIG. 3, a structural body according to the present disclosure may further include a guide unit 200 which is provided on an outer surface of the housing 100 and has a shape protruding outward. The guide unit 200 may extend along a longitudinal direction L of the housing 100. For example, referring to FIGS. 1 and 2, the length of the guide unit 200 may be equal to the length of the housing 100.

Meanwhile, as illustrated in FIGS. 2 and 3 again, the structural body 10 according to the present disclosure may further include a fixing bracket unit 300 having one side coupled to the guide unit 200.

The fixing bracket unit 300 may be configured such that the other side of the fixing bracket unit 300 is coupled to an automobile or the like. Thus, the structural body according to the present disclosure may be coupled to an automobile or the like, and accordingly, a motor accommodated within the structural body may be mounted to the automobile or the like.

Meanwhile, as illustrated in FIGS. 1 and 2, according to the present disclosure, the shapes of vertical cross-sections of the housing 100 with respect to the longitudinal direction L of the housing 100 may be constant irrespective of the positions of cross-sections. This may be understood as that the shapes of the housing 100 are constant in the longitudinal direction L of the housing 100.

According to the present disclosure, the shapes of the vertical cross-sections of the housing 100 with respect to the longitudinal direction L of the housing 100 may be constant irrespective of the positions of cross-sections. Thus, a structural material, which has the same cross-sectional structure as the vertical cross-sections of the housing 100 and is longer than the housing, is manufactured first, and then the structural material is cut to a desired length. Accordingly, the housing 100 may be manufactured. Thus, when the capacity and size of a motor to be mounted to the motor accommodation structural body are changed, a housing having a shape corresponding to the motor may be easily manufactured. Also, even if the size change of the housing is required due to the size change of the motor, existing equipment for manufacturing the structural material, which has been provided before the housing is manufactured, may be used as it is. Thus, housings having various sizes may be manufactured by one manufacturing equipment. As described later, the structural material, which has been provided before the housing 100 is manufactured, may be manufactured through a drawing or extrusion process.

Meanwhile, as illustrated in FIG. 3, according to the first exemplary embodiment of the present disclosure, the guide unit 200 may be integrally formed with the housing 100. Here, two components are integrally formed with each other, and this may represent that the two components are inseparably coupled to each other such that the two components may not be separated from each other without irreversible damages. Thus, according to an exemplary embodiment of the present disclosure, the shapes of vertical cross-sections of a housing-guide unit coupled body with respect to the longitudinal direction L of the housing 100 may be constant irrespective of the positions of cross-sections. Also, a structural material, which has been provided before the housing-guide unit coupled body manufactured according to the first exemplary embodiment of the present disclosure is manufactured, may be manufactured through the drawing or extrusion process described above. The housing-guide unit coupled body manufactured according to an exemplary embodiment of the present disclosure may be manufactured by cutting the structural material to a predetermined length.

Meanwhile, according to the present disclosure, a plurality of guide units 200 may be provided along a circumferential direction of the housing 100. More preferably, the plurality of guide units 200 may be provided at equal intervals along the circumferential direction of the housing 100. FIG. 3 illustrates a state in which twelve guide units 200 are provided at equal intervals along the circumferential direction of the housing 100.

Figure 4:
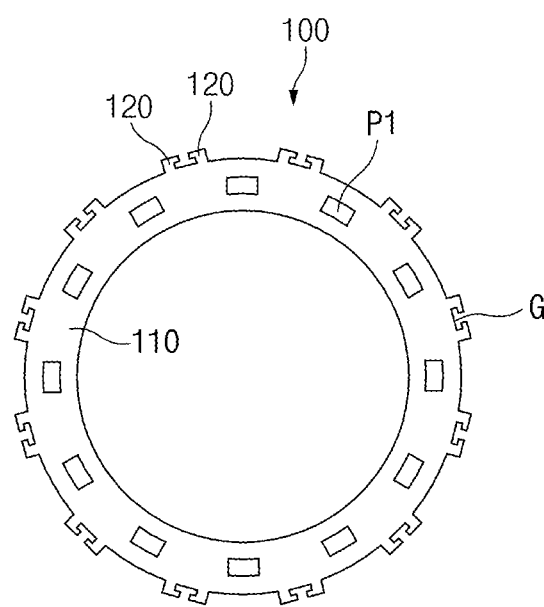
FIG. 4 is a vertical cross-sectional view in a circumferential direction illustrating a cross-sectional structure of a housing according to a second exemplary embodiment of the present disclosure.
Figure 5:
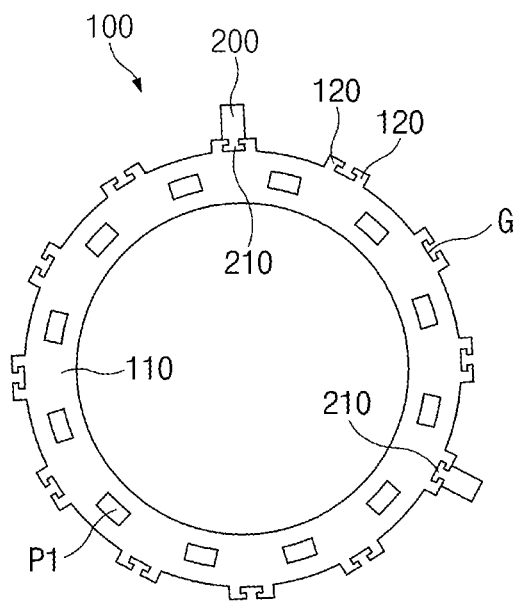
FIG. 5 is a vertical cross-sectional view in a circumferential direction illustrating a coupled structure of the housing and a guide unit according to the second exemplary embodiment of the present disclosure.

FIG. 4 is a vertical cross-sectional view in a circumferential direction illustrating a cross-sectional structure of a housing according to a second exemplary embodiment of the present disclosure, and FIG. 5 is a vertical cross-sectional view in a circumferential direction illustrating a coupled structure of the housing and a guide unit according to the second exemplary embodiment of the present disclosure. Also, FIG. 6 is a perspective view illustrating an interference structure between a guide unit and a cover in a motor accommodation structural body according to the second exemplary embodiment of the present disclosure.

Figure 6:
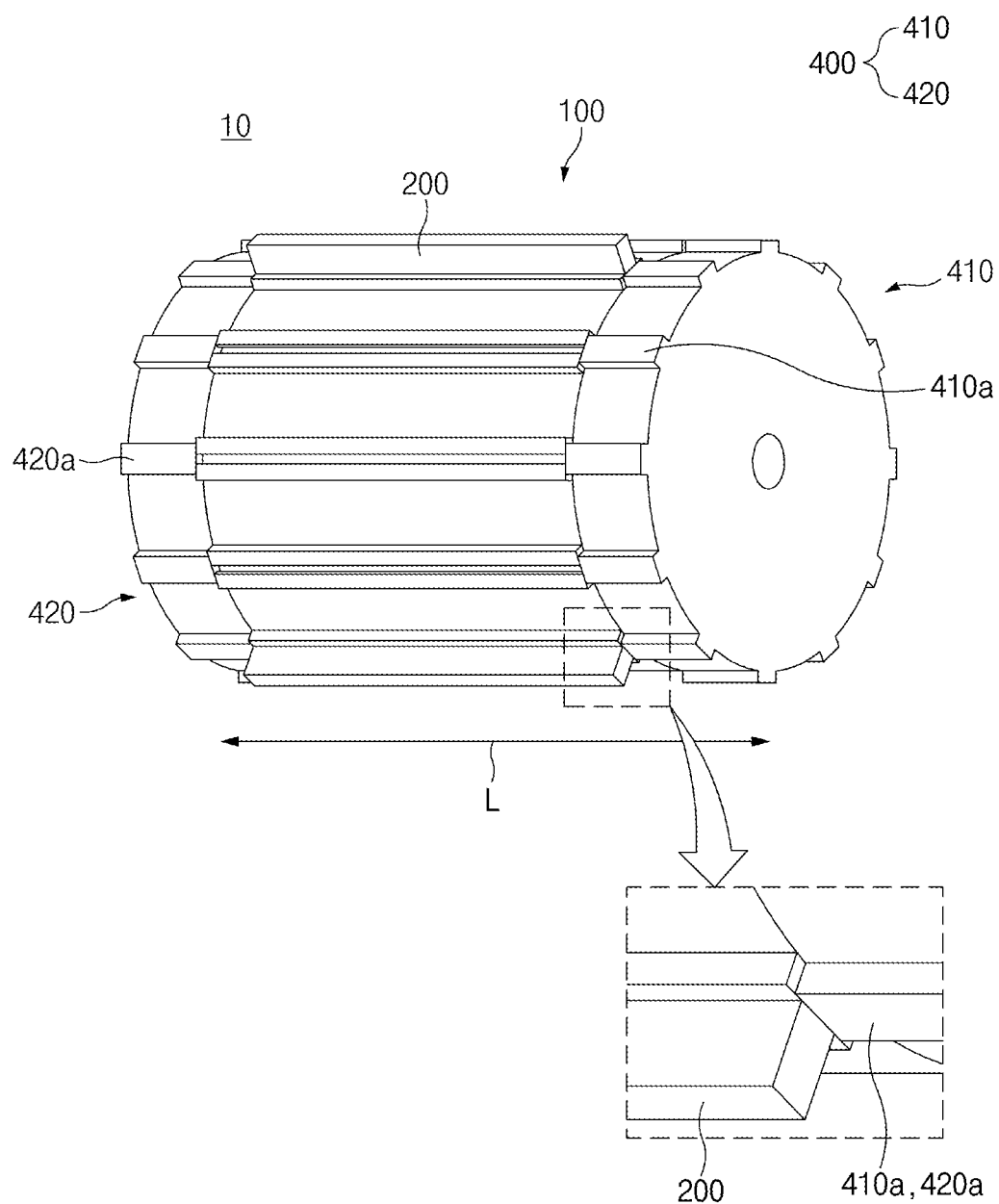
FIG. 6 is a perspective view illustrating an interference structure between a guide unit and a cover in a motor accommodation structural body according to the second exemplary embodiment of the present disclosure.

As illustrated in FIGS. 4 to 6, a guide unit 200 according to the second exemplary embodiment of the present disclosure may be provided separately from a housing 100. Thus, according to the second exemplary embodiment of the present disclosure unlike the first exemplary embodiment of the present disclosure, the housing 100 and the guide unit 200 are manufactured separately, and then, the guide unit 200 may be coupled to the outer surface of the housing 100.

More specifically, as illustrated in FIG. 4, according to the second exemplary embodiment of the present disclosure, a groove G having a shape recessed inward may be formed in the outer surface of the housing 100, and the guide unit 200 may be inserted into the groove G and coupled to the outer surface of the housing 100. Here, a plurality of grooves G may be provided along the circumferential direction of the housing 100, and the plurality of grooves G may be formed at equal intervals. Also, as illustrated in FIG. 5, according to the second exemplary embodiment of the present disclosure, guide units 200 may be inserted into some of the plurality of grooves G. FIGS. 4 and 5 illustrate a state in which twelve grooves G are formed at equal intervals in the outer surface of the housing 100 and illustrate a state in which the guide unit 200 is inserted into one of the twelve grooves G.

Continuing to refer to FIGS. 4 and 5, according to the second exemplary embodiment of the present disclosure, the housing 100 may include a housing body portion 110 that forms a body of the housing 100; and a plurality of protrusion portions 120 which are provided on an outer surface of the housing body portion 110 and have a shape protruding outward from the housing body portion 110. Here, the groove G may be formed between two neighboring protrusion portions among the plurality of protrusion portions 120. More preferably, the groove G may be formed between one protrusion portion among the plurality of protrusion portions 120 and another protrusion portion closest to the one protrusion portion.

Meanwhile, as in the second exemplary embodiment of the present disclosure, the housing 100 and the guide unit 200 are provided separately from each other. When the guide unit 200 is coupled to the outer surface of the housing 100, relative movement between the housing 100 and the guide unit 200 may occur in a longitudinal direction L of the housing 100.

In order to prevent this relative movement, according to the second exemplary embodiment of the present disclosure, as illustrated in FIG. 6, the guide unit 200 may be interfered by a first cover 410 or a second cover 420 in the longitudinal direction L of the housing 100. Thus, when relative movement between the housing 100 and the guide unit 200 in the longitudinal direction L of the housing 100 is likely to occur, the relative movement of the guide unit 200 may be restricted by the first cover 410 or the second cover 420.

More specifically, an interference portions 410a or 420a having a shape protruding outward may be formed in the outer surface of the first cover 410 or the second cover 420. Here, the housing 100 and the first cover 410 or the housing 100 and the second cover 420 may be coupled to each other such that the interference portions 410a and 420a face the guide unit 200. Thus, the guide unit 200 may be interfered by the interference portions 410a and 420a in the longitudinal direction L of the housing 100. More preferably, the interference portions 410a and 420a may be formed in all of the first cover 410 and the second cover 420. Here, the interference portion formed in the first cover 410 is referred to as a first interference portion 410a, and the interference portion formed in the second cover 420 is referred to as a second interference portion 420a. In this case, the housing 100 and a cover 400 may be coupled to each other such that each of the first interference portion 410a and the second interference portion 420a faces the guide unit 200.

Meanwhile, referring to FIGS. 4 and 5, in the guide unit 200 according to the second exemplary embodiment of the present disclosure, one end portion of the guide unit 200 inserted into the groove G of the housing 100 may be located at the same height as an outer circumferential surface of the housing 100 in areas except for the plurality of protrusion portions 120 or located outward from the outer circumferential surface. This may be understood as that the groove G formed between the plurality of protrusion portions 120 may be formed at the same height as the outer circumferential surface of the housing 100 in areas except for the plurality of protrusion portions 120 or provided outward from the outer circumferential surface.

Figure 7:
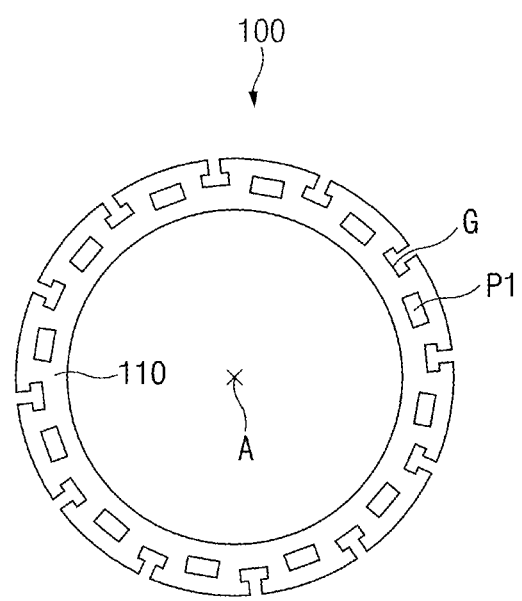
FIG. 7 is a vertical cross-sectional view in a circumferential direction illustrating a cross-sectional structure of a housing according to a third exemplary embodiment of the present disclosure.
Figure 8:
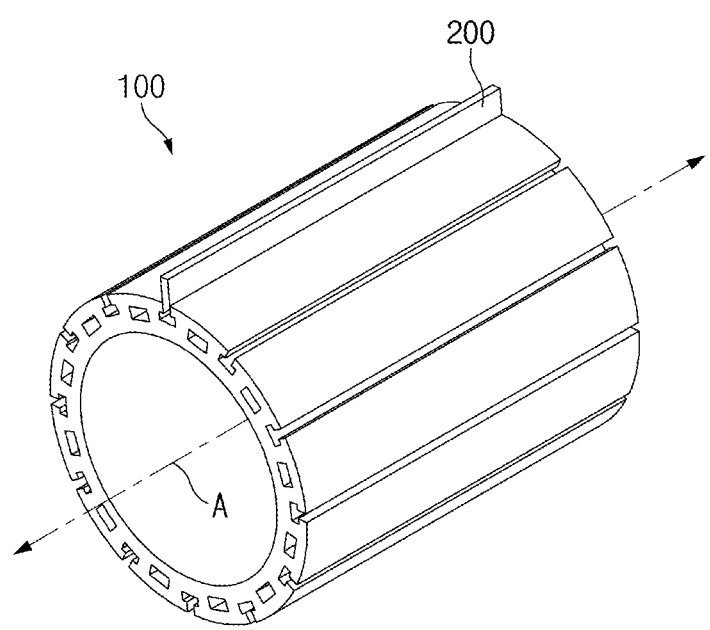
FIG. 8 is a perspective view illustrating a coupled structure of the housing and a guide unit in the circumferential direction according to the third exemplary embodiment of the present disclosure.

FIG. 7 is a vertical cross-sectional view in a circumferential direction illustrating a cross-sectional structure of a housing according to a third exemplary embodiment of the present disclosure, and FIG. 8 is a perspective view illustrating a coupled structure of the housing and a guide unit in the circumferential direction according to the third exemplary embodiment of the present disclosure.

The content described above with respect to the second exemplary embodiment of the present disclosure may be applied as it is to the third exemplary embodiment of the present disclosure within a range not contradicting each other. Thus, the third exemplary embodiment of the present disclosure will be described below mainly with regard to differences with the second exemplary embodiment.

Even in the third exemplary embodiment of the present disclosure, a plurality of grooves G may be formed in a housing 100. Here, in areas except for the areas where the grooves G are formed, distances from a central axis A of the housing 100 to the outer surface of the housing 100 may be constant.

In the third exemplary embodiment of the present disclosure, separate protrusion portions are not formed in the housing 100, and the grooves are also not formed between the protrusion portions. Thus, each of the grooves G of the housing 100 formed according to the third exemplary embodiment of the present disclosure is formed relatively further inward from the housing in a radial direction than is the groove of the housing formed according to the second exemplary embodiment of the present disclosure. Thus, according to the third exemplary embodiment of the present disclosure, one end portion of a guide unit 200 inserted into the groove G is also located inward from an outer circumferential surface of the housing 100. In this case, since the housing 100 may decrease in size, there are advantages in that the overall size of a motor accommodation structural body may also be reduced in size.

Figure 9:
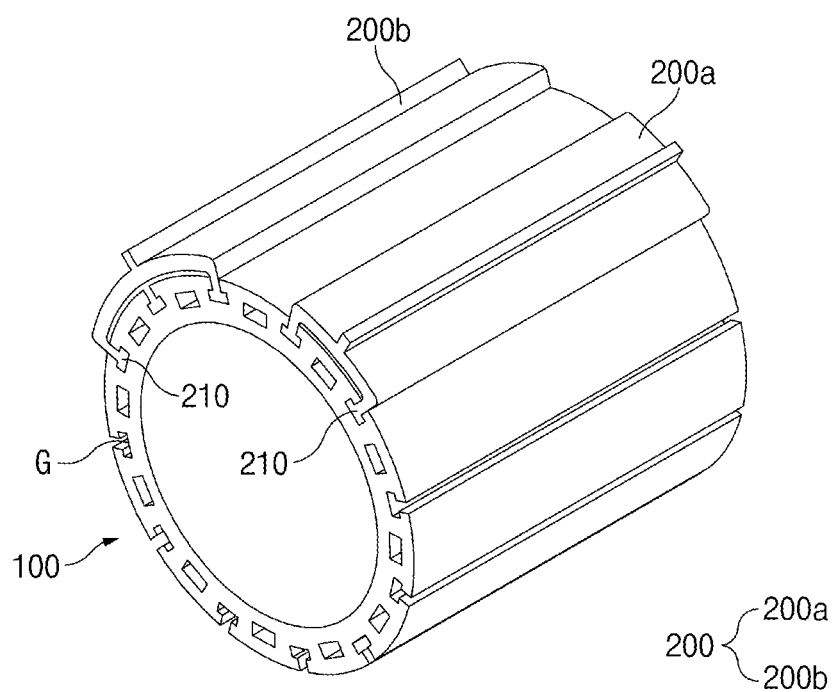
FIG. 9 is a perspective view illustrating shapes of guide units applicable to a motor accommodation structural body according to the present disclosure and a coupled structure between the guide units and a housing.

FIG. 9 is a perspective view illustrating shapes of guide units applicable to a motor accommodation structural body according to the present disclosure and a coupled structure between the guide units and a housing.

According to the present disclosure, one guide unit 200 may be inserted simultaneously into two or more grooves among a plurality of grooves G formed in a housing 100. In FIG. 9, a first guide unit 200a is illustrated as being inserted into two neighboring grooves, and a second guide unit 200b is illustrated as being inserted into three neighboring grooves. However, unlike the above, another groove into which a guide unit is not inserted may be formed between the two or more grooves into which the guide unit is inserted.

Meanwhile, as illustrated in FIGS. 5 and 9, the guide unit 200 may include an insertion protrusion portion 210 having a protruding shape so as to be coupled to the groove G. As illustrated in FIG. 5, only one insertion protrusion portion 210 may be formed in one guide unit 200. However, as illustrated in FIG. 9, a plurality, e.g., two or more, of insertion protrusion portions 210 may be formed in one guide unit 200. Meanwhile, in order to prevent the guide unit 200 inserted into and fixed to the groove G from being separated from the housing 100 in the radial direction of the housing, an area recessed in the circumferential direction of the housing may be formed on the inside of the groove G, and a locking projection, which has a protruding shape so as to have a shape corresponding to the groove G and restricts movement of the guide unit 200 in the radial direction of the housing, may be formed at an end portion of the insertion protrusion portion 210.

Meanwhile, according to the present disclosure, in order to increase strength of a guide unit 200 and a bracket unit 300, each of the guide unit 200 and the bracket unit 300 may include a plurality of materials. More preferably, each of the guide unit 200 and the bracket unit 300 may have a multi-layer structure including different materials. For example, a material of a surface layer and a material of an inner layer may be different from each other in the guide unit 200 and the bracket unit 300. The guide unit 200 and the bracket unit 300, which have the multi-layer stricture, may be manufactured through double injection molding.

Figure 10:
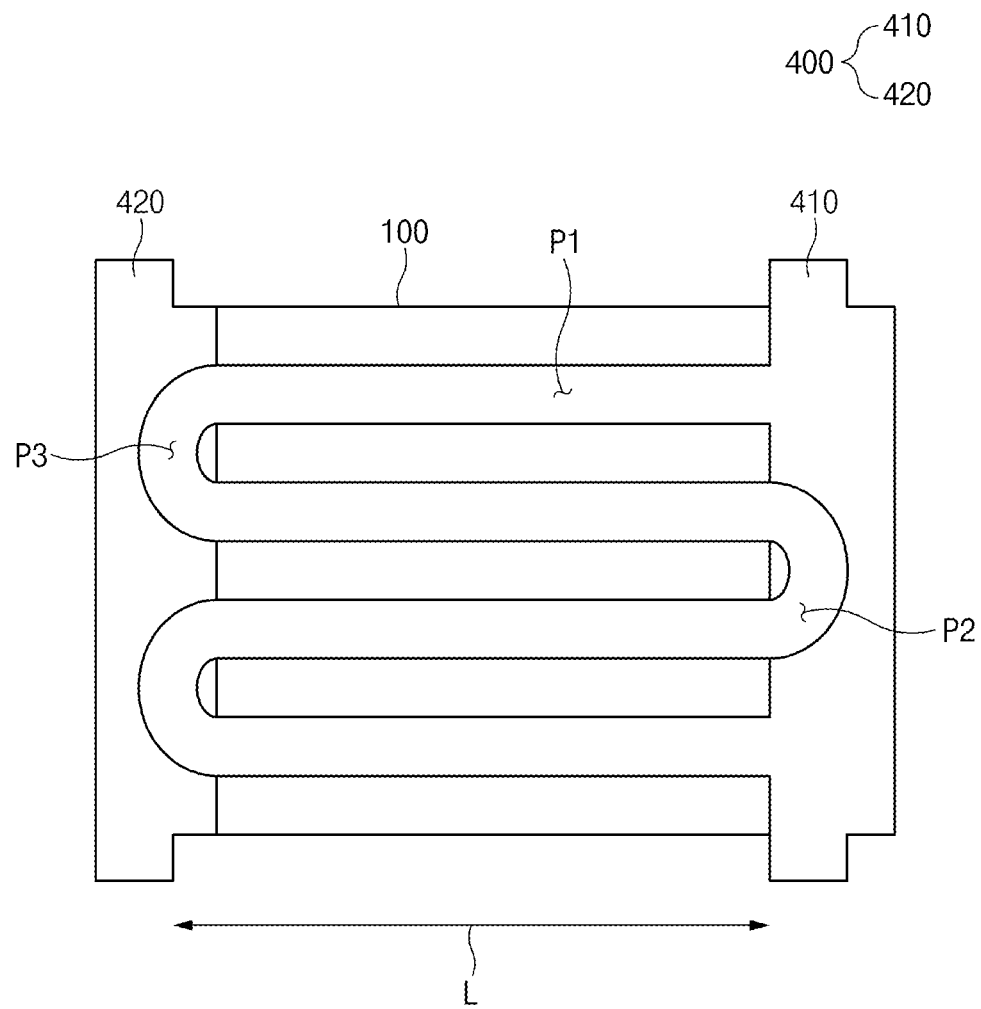
FIG. 10 is a vertical cross-sectional view in an axial direction illustrating an internal structure of a housing and a cover in a motor accommodation structural body according to the present disclosure.

FIG. 10 is a vertical cross-sectional view in an axial direction illustrating an internal structure of a housing and a cover in a motor accommodation structural body according to the present disclosure.

As illustrated in FIGS. 3, 4, 5, 7, 9, and 10, a through-flow path P1, which extends along the longitudinal direction L of the housing 100 and passes through the housing 100, may be formed in the housing 100 of the structural body according to the present disclosure. More specifically, the through-flow path P1 may be a component which passes through the housing 100 from one side surface of the housing 100 coupled to the first cover 410 to the other side surface coupled to the second cover 420.

Also, as illustrated in FIG. 10, a first connection flow path P2 communicating with the through-flow path P1 may be formed in the first cover 410, and a second connection flow path P3 communicating with the through-flow path P1 may be formed in the second cover 420.

The through-flow path P1 and the connection flow paths P2 and P3, which are formed in the housing 100 and the cover 400, respectively, may be components for providing paths through which a cooling fluid for cooling a motor accommodated in the structural body 10 flows.

Meanwhile, as illustrated in FIG. 10, a plurality of through-flow paths P1 may be formed. More specifically, the plurality of through-flow paths P1 may be formed along the circumferential direction of the housing 100.

Here, one end portion of the first connection flow path P2 may communicate with one of the plurality of through-flow paths P1, and the other end portion of the first connection flow path P2 may communicate with another one of the plurality of through-flow paths P1. Also, one end portion of the second connection flow path P3 may communicate with one of the plurality of through-flow paths P1, and the other end portion of the second connection flow path P3 may communicate with another one of the plurality of through-flow paths P1. In this case, the cooling fluid may perform a cooling function while flowing in a zigzag pattern along the longitudinal direction of the structural body 10. Meanwhile, a plurality of first connection flow path P2 and a plurality of second connection flow path P3 may be provided. Meanwhile, although not illustrated in the drawings, a fluid inlet, through which the cooling fluid flows in, and a fluid outlet, through which the cooling fluid flows out, may be formed in the housing 100.

Automobile

Figure 11:
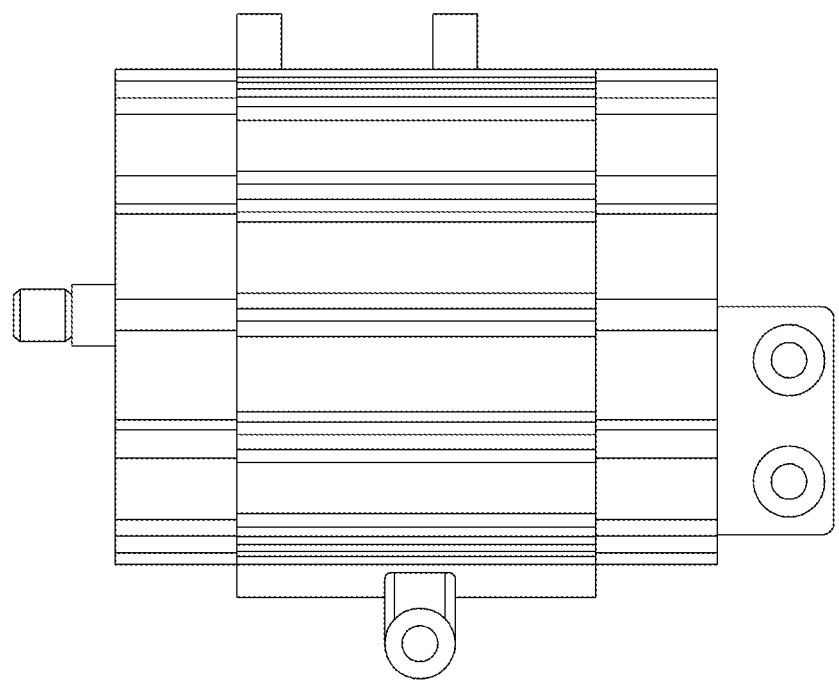
FIG. 11 is a side view illustrating a structure in which a motor is assembled with a motor accommodation structural body according to the present disclosure.
Figure 12:
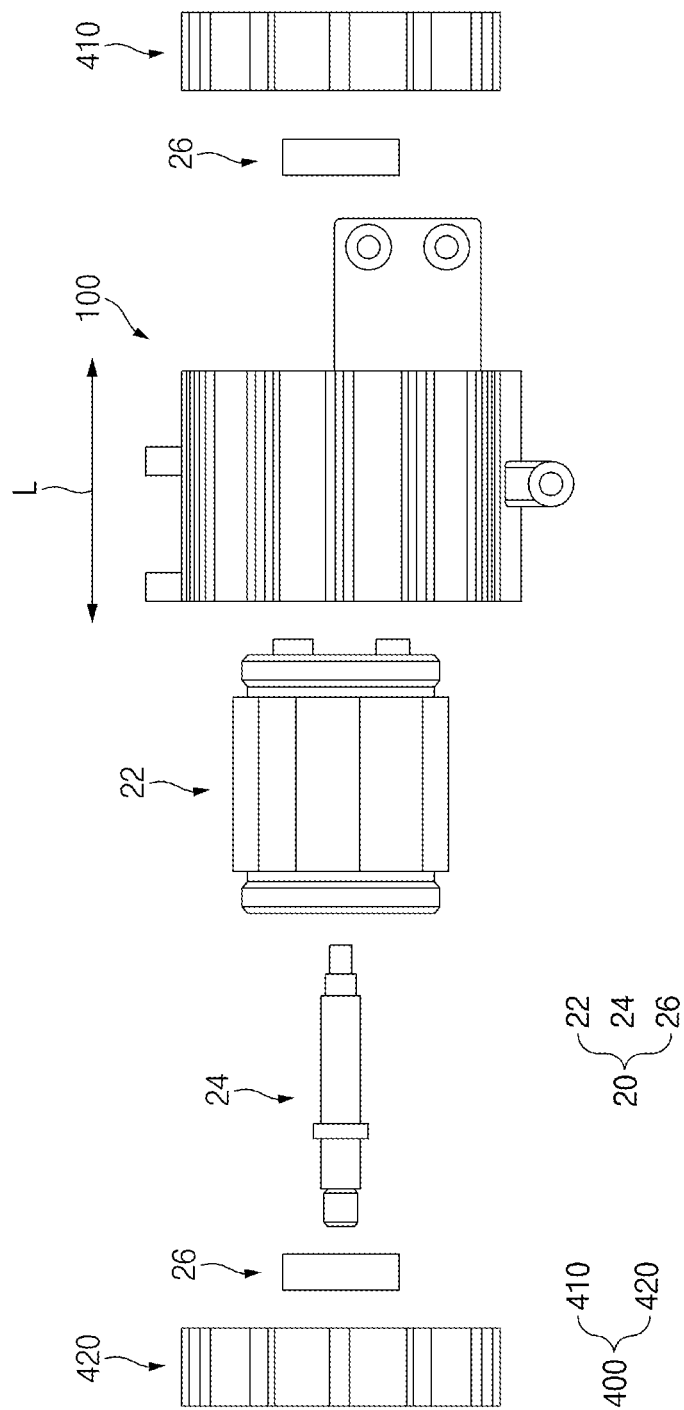
FIG. 12 is an exploded side view illustrating exploded structures of the motor accommodation structural body and the motor of FIG. 11.

FIG. 11 is a side view illustrating a structure in which a motor is assembled with a motor accommodation structural body according to the present disclosure, and FIG. 12 is an exploded side view illustrating exploded structures of the motor accommodation structural body and the motor of FIG. 11.

An automobile according to the present disclosure may include a motor 20 and a structural body 10 for accommodating the motor 20.

As illustrated in FIG. 12, the motor 20 may include a stator 22, a shaft 24 provided inside the stator 22, and a bearing 26 provided between the stator 22 and the shaft 24.

Also, the structural body 10 may include: a housing 100 having an empty space formed therein and accommodating the stator 22 in the empty space; a first cover 410 coupled to one side surface of the housing 100 in a longitudinal direction L; a second cover 420 coupled to the other side surface of the housing 100 in the longitudinal direction L; a guide unit 200 which is provided on an outer surface of the housing 100, has a shape protruding outward, and extends along the longitudinal direction L of the housing 100; and a fixing bracket unit 300 having a coupling portion which has one side coupled to the guide unit 200 and the other side coupled to the automobile.

Method for Manufacturing Motor Accommodation Structural Body

Referring to FIGS. 1 to 12, a method for manufacturing a motor accommodation structural body according to the present disclosure may include: a first operation of manufacturing a structural material, which is formed in a cylindrical shape and has a first through-hole at the center thereof, through a drawing or extrusion process; a second operation of manufacturing a housing 100 having a predetermined length by cutting the structural material in a direction perpendicular to a longitudinal direction of the structural material; and a third operation of coupling a first cover 410 to one side surface of the housing 100 in a longitudinal direction L and coupling a second cover 420 to the other side surface of the housing 100 in the longitudinal direction L. Here, the first through-hole may correspond to an empty space which is formed in the housing 100 so as to accommodate a motor.

Meanwhile. in the first operation, a plurality of second through-holes, which are provided along a circumferential direction and pass through the structural material, may be formed in the structural material. Also, in the second operation, a plurality of through-flow paths P1, which are provided along the circumferential direction, pass through the housing 100, and have a shape corresponding to the second through-holes formed in the structural material, may be formed in the housing 100. Also, in the third operation, a first connection flow path P2 and a second connection flow path P3 may be formed in the first cover 410 and the second cover 420, respectively. Here, in the third operation, the first cover 410 and the second cover 420 may be coupled to the housing 100 so that each of the first connection flow path P2 and the second connection flow path P3 communicates with each of the through-flow paths P1.

Meanwhile, according to the method for manufacturing the motor accommodation structural body according to the present disclosure, a guide unit 200 having a shape protruding outward may be provided on an outer surface of the housing 100. Here, according to an example of the method for manufacturing the motor accommodation structural body according to the present disclosure, the guide unit 200 may be integrally formed with the housing 100 in the first operation and the second operation. That is, according to an example of the method for manufacturing the motor accommodation structural body according to the present disclosure, the structural material, which has been provided before a housing-guide unit coupled body is manufactured, may be manufactured in the first operation through the drawing or extrusion process, and the housing-guide unit coupled body may be manufactured in the second operation by cutting the structural material to a predetermined length.

Unlike the above, according to another example of a method for manufacturing a motor accommodation structural body according to the present disclosure, a guide unit 200 may be provided separately from a housing 100. In this case, a groove G having a shape recessed inward from the housing 100 may be formed in an outer surface of the housing 100. Here, the method for manufacturing the motor accommodation structural body according to the present disclosure may further include a fourth operation of inserting a guide unit 200, which extends along the longitudinal direction L of the housing 100, into the groove G formed in the outer surface of the housing 100.

According to the present disclosure, the structural material having the first through-hole and the second through-hole is manufactured through the drawing or extrusion process, and the housing may be manufactured by cutting the structural material to the desired size. Thus, housings having various sizes may be manufactured in one manufacturing equipment. In particular, even when the size of a motor accommodation structural body for accommodating a motor has to be changed due to a size change of the motor mounted inside an automobile, a housing having the changed size may be manufactured from a structural material by using an existing manufacturing equipment. The positions at which the motor accommodation structural body is fixed to the automobile are changed depending on the types of automobiles, and this may be coped with by changing the formation locations of the guide unit and the structure of the fixing bracket unit. Thus, according to the present disclosure, the motor accommodation structural body is divided into the common parts (e.g., the housing or the cover) which can be used in common irrespective of the sizes and structures of the motor accommodation structural body and the other parts (e.g., the guide unit or the fixing bracket unit) which are changed according to the types of the structural body. Thus, even if the structural body having a structure different from an existing one is manufactured, the structural change thereof may be minimized.

According to the present disclosure, in order to manufacture the structural body having a different structure due to the structural change of a motor, the components of the structural body are divided into the parts which can be used in common irrespective of the types of structural bodies and the parts which are changed according to the types of structural bodies. Thus, even if the structural body having a structure different from an existing one is manufactured, the structural change thereof may be minimized.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A motor accommodation structural body for accommodating a motor for an automobile, the motor accommodation structural body comprising:
    a housing having an empty space formed therein;
    a guide unit which is disposed on an outer surface of the housing, has a shape protruding outward, and extends along a longitudinal direction (L) of the housing; and
    a fixing bracket unit having a coupling portion which has one side coupled to the guide unit and another side coupled to the automobile;
    a first cover coupled to one side surface of the housing in the longitudinal direction (L); and
    a second cover coupled to another side surface of the housing in the longitudinal direction (L),
    wherein the guide unit is interfered by being in contact with the first cover or the second cover in the longitudinal direction (L) of the housing.

2. The motor accommodation structural body of claim 1, wherein the guide unit is integrally formed with the housing.

3. The motor accommodation structural body of claim 1, wherein the guide unit is separatable from the housing, and the guide unit is coupled to an outer surface of the housing.

4. The motor accommodation structural body of claim 1, wherein the housing has a through-flow path formed therein, the through-flow path extending along the longitudinal direction (L) of the housing and passing through the housing.

5. The motor accommodation structural body of claim 4, wherein a first connection flow path communicating with the through-flow path is formed in the first cover, and
    a second connection flow path communicating with the through-flow path is formed in the second cover.

6. The motor accommodation structural body of claim 5, wherein the through-flow path is provided in plural,
    wherein one end portion of the first connection flow path communicates with one of the plurality of through-flow paths, and
    another end portion of the first connection flow path communicates with another one of the plurality of through-flow paths.

7. The motor accommodation structural body of claim 2, wherein the guide unit is provided in plural along a circumferential direction of the housing.

8. The motor accommodation structural body of claim 1, wherein a groove having a shape recessed inward from the housing is formed in an outer surface of the housing, and the guide unit is inserted into the groove.

9. The motor accommodation structural body of claim 8, wherein the housing comprises:
    a housing body portion that forms a body of the housing; and
    a plurality of protrusion portions which are disposed on an outer surface of the housing body portion and have a shape protruding outward from the housing body portion,
    wherein the groove is formed between two neighboring protrusion portions among the plurality of protrusion portions.

10. The motor accommodation structural body of claim 8, wherein, in areas except for the area where the groove is formed, distances from a central axis of the housing in a circumferential direction to the outer surface of the housing are constant.

11. The motor accommodation structural body of claim 1, wherein an interference portion having a shape protruding outward is formed in an outer surface of the first cover or the second cover, and
    the guide unit is interfered by the interference portion in the longitudinal direction (L) of the housing.

12. The motor accommodation structural body of claim 8, wherein the groove is provided in plural along a circumferential direction of the housing, and the guide unit is inserted into each of some of the plurality of grooves.

13. The motor accommodation structural body of claim 9, wherein one end portion of the guide unit inserted into the groove of the housing is located at the same height as an outer circumferential surface of the housing in areas except for the plurality of protrusion portions, or is located outward from the outer circumferential surface.

14. The motor accommodation structural body of claim 8, wherein one end portion of the guide unit inserted into the groove is located inward from an outer circumferential surface of the housing.

15. An automobile comprising:
a motor for an automobile, which comprises a stator; and
a motor accommodation structural body configured to accommodate the motor,
wherein the motor accommodation structural body comprises:
a housing having an empty space formed therein and accommodating the stator in the empty space;
a first cover coupled to one side surface of the housing in a longitudinal direction (L);
a second cover coupled to another side surface of the housing in the longitudinal direction (L);
a guide unit which is disposed on an outer surface of the housing, has a shape protruding outward, and extends along the longitudinal direction (L) of the housing; and
a fixing bracket unit having a coupling portion which has one side coupled to the guide unit and another side coupled to the automobile, and
wherein the guide unit is interfered by being in contact with the first cover or the second cover in the longitudinal direction (L) of the housing.

16. A method for manufacturing a motor accommodation structural body, the method comprising:
a first operation of manufacturing a structural material, which is formed in a cylindrical shape and has a first through-hole at a center of the structural material, through a drawing or extrusion process;
a second operation of manufacturing a housing having a predetermined length by cutting the structural material in a direction perpendicular to a longitudinal direction of the structural material; and
a third operation of coupling a first cover to one side surface of the housing in a longitudinal direction (L) and coupling a second cover to another side surface of the housing in the longitudinal direction (L),
wherein a guide unit having a shape protruding outward is provided on an outer surface of the housing, and
wherein, in the third operation, the guide unit is interfered by being in contact with the first cover or the second cover in the longitudinal direction (L) of the housing.

17. The method of claim 16, wherein, in the first operation, a plurality of second through-holes, which are provided along a circumferential direction and pass through the structural material, are formed in the structural material,
wherein, in the second operation, a plurality of through-flow paths, which are provided along the circumferential direction, pass through the housing, and have a shape corresponding to the second through-holes, are formed in the housing,
wherein, in the third operation, a first connection flow path and a second connection flow path are formed in the first cover and the second cover, respectively, and the first cover and the second cover are coupled to the housing so that each of the first connection flow path and the second connection flow path communicates with each of the plurality of through-flow paths.

18. The method of claim 16,
wherein, in the first operation and the second operation, the guide unit is integrally formed with the housing.

19. The motor accommodation structural body of claim 12, wherein the guide unit is inserted simultaneously into three or more grooves among the plurality of grooves.

20. The motor accommodation structural body of claim 1, wherein the one side of the coupling portion of the fixing bracket unit has a fixing groove such that both side surfaces of the guide unit are coupled to the fixing groove.

* * * * *